United States Patent
Gimbert

[15] 3,694,584

[45] Sept. 26, 1972

[54] PREFERRED CUSTOMER COMMUNICATION SYSTEM

[72] Inventor: Leon M. Gimbert, 161-Rue de Javel, Paris, France

[22] Filed: May 28, 1971

[21] Appl. No.: 147,797

[30] Foreign Application Priority Data

May 29, 1970 France....................7019758

[52] U.S. Cl...............................179/18 D, 179/18 B

[51] Int. Cl..........................H04m 3/20, H04m 3/38

[58] Field of Search..........179/18 D, 27 FE, 42, 18 B

[56] References Cited

UNITED STATES PATENTS 2,943,155 6/1960 Rockwell...............179/27 FE

*Primary Examiner*—William C. Cooper
*Attorney*—Abraham A. Saffitz

[57] ABSTRACT

Preferred customer communication system in which trunks available to a regular switching network are selectively connected to preferred customers whether or not these trunks are engaged on a regular customer call. A commandeer doubly coded signal controls a transfer relay. The commandeer signal is in the "p out-of n" code and the bits 1 and 0 are represented by short and long duration pulses.

3 Claims, 3 Drawing Figures

INVENTOR:
LEON M. GIMBERT
By Abraham A. Saffitz
ATTORNEY

INVENTOR:
LEON M. GIMBERT
By Abraham A. Saffitz
ATTORNEY

PREFERRED CUSTOMER COMMUNICATION SYSTEM

This invention relates to communications networks and particularly to arrangements for establishing special priority communication paths between preferred customers.

Telecommunications organizations frequently find it necessary to place a certain number of trunk circuits at the disposal of important users for priority requirements. A disastrous event, an important sporting event etc . . . imply the utilization of numerous links to establish communication between press correspondents and their editor's desk or their radio broadcasting organizations. Similarly, various ministries and public services or private services use right-of-way connections to exchange information and to no longer be dependent on general traffic. The special links to be made, therefore, are not permanent but are solely designated in advance; they can then be withdrawn from normal telephone operation to be switched and placed at the disposal of preferred customers as soon as the latter require them.

In conformity with the invention, certain trunks normally available to a regular switching network are arranged in a special manner so that preferred customers can commandeer these trunks, whether or not they are presently engaged on a regular customer call, by sending a doubly coded commandeer signal. This signal is a set of "p out-of n" binary code pulses, the binary code pulses being short or long according to whether they represent 0 or 1 binary digits and this set of pulses is preceded by a very long pulse designed to provoke starting of the decoder device prior to receiving code pulses. To fix ideas, it will be assumed that the "p out-of n" code is a "2 out-of 5" code, that the short pulses have a period of 200 ms, the long pulses a period of 700 ms and the very long pulse a period of 5 seconds and that the code combination performing the connection is the combination in which the long pulses are the second and fifth. The period between pulses is 700 ms at most.

The unit, to perform decoding, must be equipped with two categories of components all operating under the control of a calling relay:

1°. — a time counter capable of measuring the pulse period so as to differentiate between the long and short pulses;

2°. — a pulse counter capable of determining the serial number of each pulse in the commandeer signal. If the time counter detects a long pulse, the pulse counter behaves as a switching device to operate a recording relay whose number corresponds to the received long pulse serial number. Of course, no recording relay corresponds to the very long pulse.

Thus, if the commandeer signal is correct, on completion of reception, two recording relays must be in the operated state and the three others must remain inoperative. This condition is checked by a conventional check circuit of the "2 out-of 5" code. A second condition is also mandatory: the two operated recording relays must also be the second and fifth.

If, after checking, these two conditions are correctly fulfilled at the end of the commandeer signal, the transfer relay operates and holds on. The trunk, at which moment is instantaneously withdrawn from regular customer operation, is directly switched to the preferred customer's line. Occupation is automatically signalled and a supervision signal warns exchange personnel. This situation will last until the free line signal is received.

To again make the seized trunk available for normal operation, a free line signal is actuated. This signal consists of a continuous pulse lasting at least for twenty seconds. A line freeing relay releases after an appropriate time interval (12 seconds) but the circuit is only restored to normal operation after the twenty second pulse. This arrangement makes it possible to switch the two ends of the circuit at one and the same time since a commandeer unit must, of course, be installed at each end of the trunk concerned.

The invention will now be described in detail with reference to the attached drawings in which.

Figure 1:
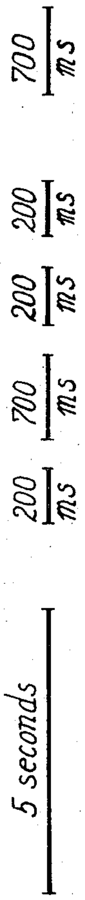
FIG. 1 illustrates the coded commandeer signal described in the introductory part.
Figure 2:
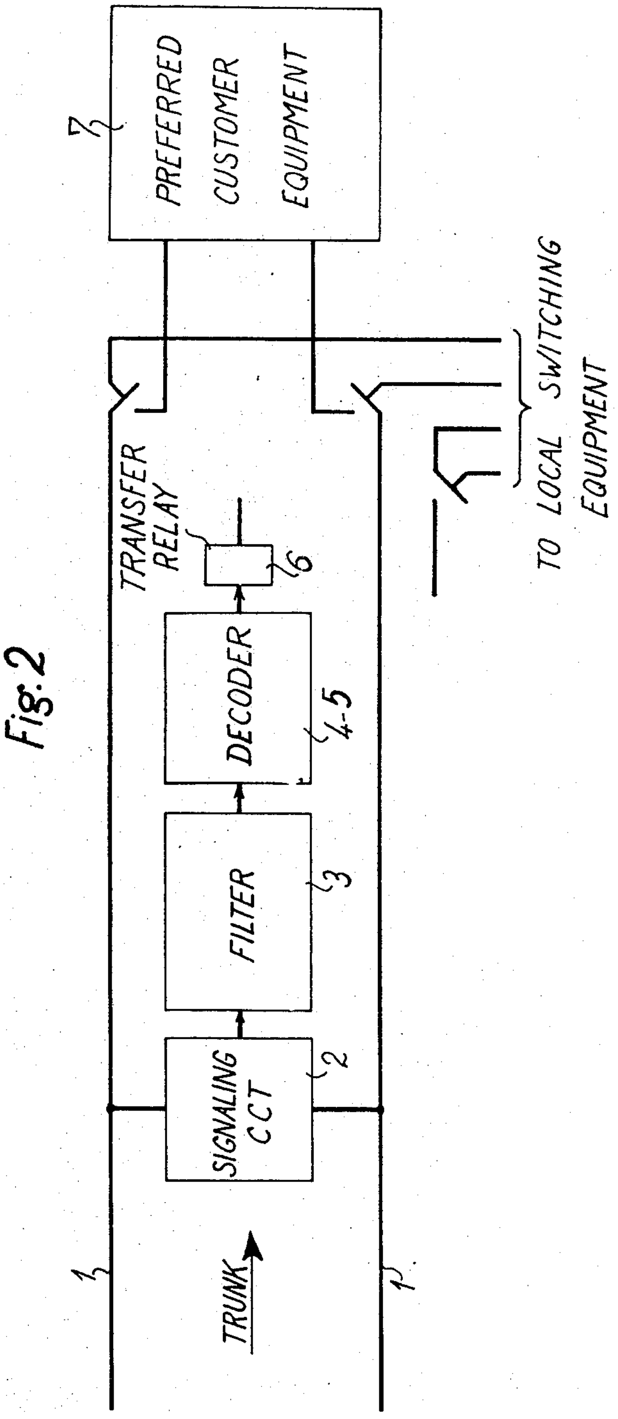
FIG. 2 represents the trunk commandeer unit concerned by the invention in the form of a block diagram.

Referring now to FIG. 2, the automatic trunk commandeer unit consists of a signalling device 2 permanently connected to trunk 1 to be seized for the benefit of the preferred customer. This connection is made before the trunk equipment in the local switching network. Signalling device 2 is connected to a telephone pulse filter circuit 3, then to a decoder circuit 4–5, itself connected to a transfer relay 6.

The signalling device actuates the decoder circuit if the current received from the trunk is of the same nature as the trunk telephone signalling current, that is to say a 50 Hz current when signalling takes place on speech lines or a ground potential on one of the line wires. The signalling device remains insensitive to speech currents. The impedance of this signalling device is practically infinite in the speech frequency band and has a value of 50,000 ohms for the 50 Hertz current.

Now, the decoder device contains a relatively large number of relays (13 relays and 2 pulse counters) and it would be unnecessary and even disastrous to actuate some of these components with the signals usually transmitted on the trunk during normal operation. Signalling device 2, nevertheless, correctly detects all these signals. But, despite this detection, the decoder device remains absolutely inert since, between it and the signalling device, is inserted a trunk telephone pulse blocking device 3. For this reason, whatever the category of the circuit (manual, automatic or semi-automatic) the duration of the received pulses is such that it does not enable actuation of the decoder device.

Figure 3:
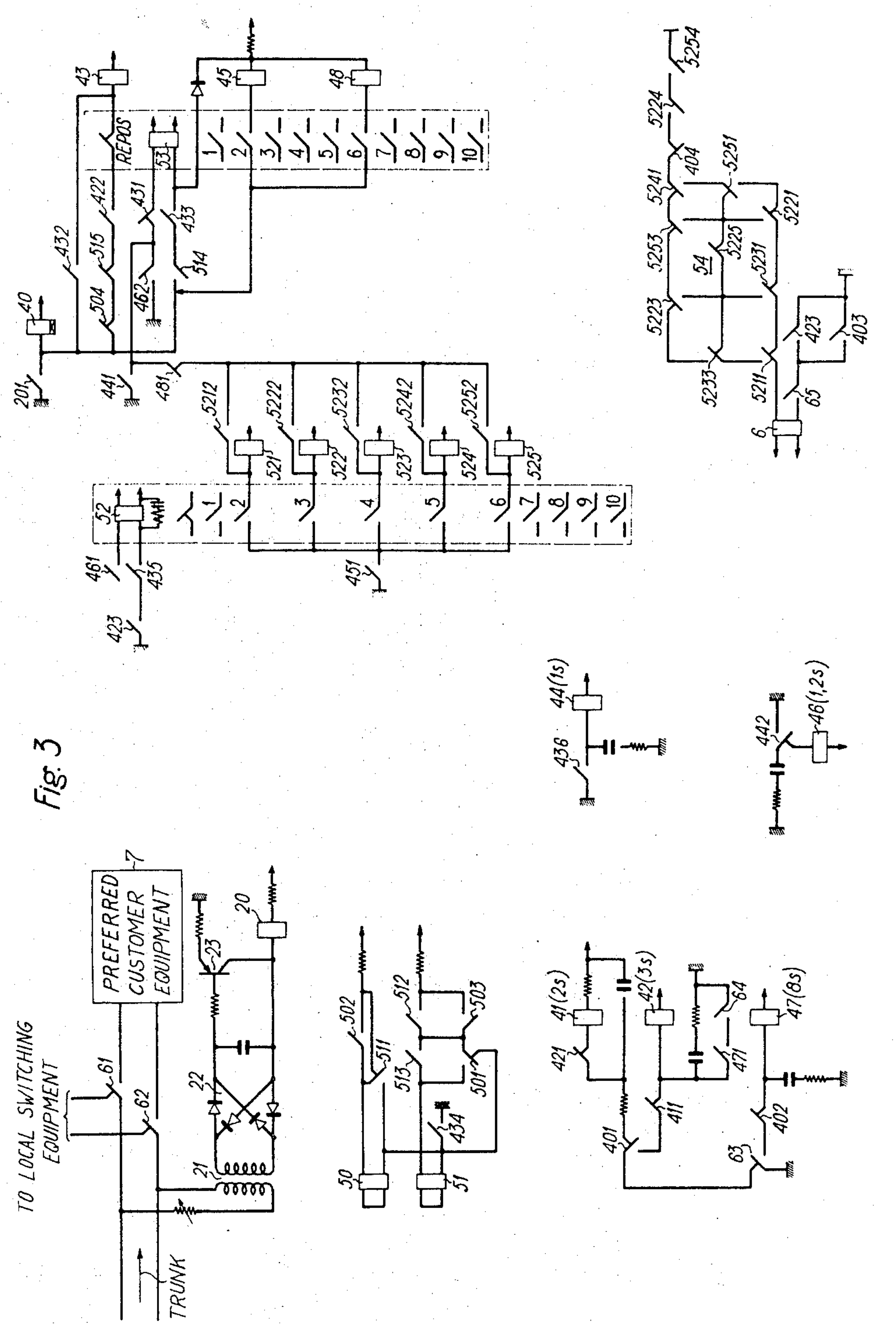
FIG. 3 illustrates the detailed electrical diagram of this commandeer unit.

By referring to FIG. 3, the signalling device 2 includes a transformer 21, a rectifier bridge 22 and a transistor 23 supplying a relay 20. If the circuit used is a four wire circuit, relay 20 is directly connected to the reception line.

Relay 20 operates with all the pulses received on the transmission channel. On the other hand, its contact 201 in its operative position only makes relay 40 operate if the pulses last for more than 70 milliseconds. This prevents relay 40 (with copper head) from beating unnecessarily on the automatic telephone dialing pulses. However, for trunk acquisition, relay 40 serves as an auxiliary for relay 20. On reception of the 5 second pulse, relay 20 starts to operate and makes relay 40 operate after a 70 milliseconds delay. After 2 seconds, relay 41 releases since contact 401 is open (relay 41 always functions when the trunk is not acquired). When relay 41 releases, relay 42 is made to operate through the path: ground, contact 63 at rest, contact 401 in its operating state, contact 411 at rest, winding of 42, battery. From this moment, relay 43 operates through the path: ground, contact 201 in its operating state, contact 504 at rest, contact 515 at rest, contact 422 in its operating state, contact at rest of counting relay 53, winding of relay 43, battery. Relay 43 makes relay 44 operate through its contact 436 in its operating state, this relay 44 being a holding relay which continues to function throughout the commandeer signal since no pulse lasts for more than 700 milliseconds and relay 43 has a 1 second release time. Relay 43 holds through contacts 432 and 201 both in operating state.

Thus two well distinct but simultaneous operations start. Relay 43 firstly actuates, through its contact 435, the counter 52 ("Pentaconta" type pulse counter progressing step by step), but also, through its contacts 434 and 433, it provokes starting of the time counter, that is to say the two beat relays 50 and 51 and the counting relay 53 (counter 53 is also of "Pentaconta" type). The beat relays 50 and 51 form a square wave pulse generator. When both the relays are supplied by the closing of contact 434, relay 50 takes 50 milliseconds to pull. After it starts to operate it attempts to also operate relay 51. However, the latter takes also 50 milliseconds to pull. Operation of relay 51 causes the release of relay 50 through short-circuiting of its winding with a delay of 50 milliseconds. Then the release of relay 50 provokes the release of relay 51 also by short-circuiting, 50 milliseconds later. Thus the system, when left to itself, delivers square wave signals. On supply of relays 50 and 51, relay 51 remains 100 milliseconds at rest and then remains 100 milliseconds in its operating condition and so on. This layout makes it possible to measure times to within 100 milliseconds. The time counter 53 progresses by one step every time that relay 51 is made to operate through contact 514 in its operating state. Release of relay 51 remains without effect on counter 53. Thus, at the instant 100 millisecond, the counter passes to position 1. It will pass to position 2 at the instant 300 millisecond. To detect the instant 400 millisecond, which is the limit for discriminating between a long pulse and a short pulse, it suffices to follow the following path: ground, contact 201 at rest, contact 514 in its operating state, contact No. 2 of counter 53, winding of relay 45, battery. When relay 45 pulls, this indicates that the pulse received is a long pulse. In other respects, since counter 52 progresses by one step at every pulse generated by the release of contact 435, it makes it possible to ascertain the serial number of the pulse received. Therefore, if relay 45 operates, that is to say if the pulse is long, contact 451 closes and the relay corresponding to the serial number of the pulse received is made to operate:

1st pulse: relay 521
2nd pulse: relay 522
3rd pulse: relay 523
4th pulse: relay 524
5th pulse: relay 525

To summarize:

During the complete reception of the commandeer signal, relays 20, 40 and 43 each operate six times. Relay 41 releases during reception of the initial pulse. On the other hand, relays 42 and 44 hold on during the reception of the entire signal. Since relay 43 operates at each pulse, it serves as a drive for the time counter and causes the pulse counter to progress. Release of 43 brings the time counter again to stop (release of contact 434 cuts off ground potential to timing pulse generator 50–51). If, during its progress, the time counter 53 exceeds the 400 millisecond limit, the pulse counter 52 fulfills the purpose of a switch to store the serial number of the long pulse received by causing to hold the relay corresponding to the serial number of this long pulse. Thus, at the end of the signal, there must be two relays of the pulse counter which have operated and held on.

If, at the end of the signal, when relay 40 releases, relays 522 and 525 are operative while relays 521, 523 and 524 remain inoperative, transfer relay 6 starts to operate and holds. From this moment, the trunk is withdrawn from regular operation and directly connected to preferred customer's equipment 7. The feed line of transfer relay 6 passes through a 2 out-of 5 code parallelogram circuit 54 which is a circuit well known in the prior art. At the end of the commandeer signal, relay 44 releases. Relay 46 then operates for approximately 1.2 second and resets counters 52 and 53 by supplying their upper windings respectively through closed contacts 461 and 462. Release of relay 40 also makes freeing relay 47 operate by the following path: ground, contact 63 in its operating state, contact 402 at rest, winding of relay 47, battery. Thus, at the end of the reception of a commandeer signal, three relays remain in operation these being relays 6, 42 and 47.

If a pulse is considered as being long because it lasts for more than 400 milliseconds, it must not also last unnecessarily. This is why, if the time counter 53 when progressing under the control of relay 51, passes to its position No. 6, it operates relay 48. The attraction of relay 48 has the effect of opening at contact 481 the holding circuit of the recording relays of the long pulses. Thus, since a signal with extra-long pulses is considered as erroneous, transfer relay 6 will be not be capable of finding an attraction route since relays 521–525 have been released.

The 400 millisecond instant has been selected as a long pulse criterion because the time counter progresses with the beats of relay 51. Now relays 50 and 51 have operating time constants guaranteed within ± 20 percent, that is to say that instant 400 ms can, in actual fact, oscillate between 320 and 480 milliseconds. Thus, when a signal is decoded, there can be no confusion between a short pulse and a long pulse even if the trunk exhibits line distortion.

The trunk freeing signal, that is to say the restoration to regular operation consists of a pulse approximately 20 seconds long. Relay 20 operates and causes relay 40 to operate. After 8 seconds, since contact 402 is open, relay 47 releases. Three seconds later, since contact 471 is open, relay 42 releases. But transfer relay 6 is maintained by its second winding through the path: ground, contact 403 in its operating state, contact 65 in its operating state, relay 6, battery. Therefore relay 6 only releases at the end of the 20 second pulse. This disposition makes it possible to restore the two ends of the trunk simultaneously to regular operation.

In actual fact, the possibilities offered by the equipment covered by the invention are numerous. Commandeer signals differently coded but all in "2 out-of 5" code make it possible to selectively connect to a given trunk preselected preferred customers.

Summary of relay functions:

20: call relay operating during any pulse received by the circuit;

40: auxiliary of relay 20 only operating if the pulse lasts for more than 70 milliseconds. It thus filters the automatic telephone dialing pulses and also filters the call and end of call signals in the manually operated trunks;

41: discrimination relay of the initial pulse of 5 seconds;

42: relay with two functions. (1 ) It provokes start of the decoding operations up to end of signal. (2°) It takes part in restoration;

44: relay that remains at work during the whole commandeer signal;

46: relay controlling the resetting of the time counter and pulse counter and the end of the commandeer signal;

43: time counter and pulse counter drive relay;

45: relay characterizing the 400 millisecond instant;

48: relay characterizing the 1,200 millisecond instant;

521 to 525: long pulse recording relays;

6: transfer relay;

47: restoration relay.

The description of the invention has been made in the case where the preferred customer is the called subscriber. The commandeer device is in parallel on the trunk wires. If the preferred customer is the calling subscriber, the commandeer device is placed in parallel on the wires of the subscriber's line and transfer relay 6 instead of connecting the trunk to the subscriber's line connects the subscriber's line to the trunk.

What I claim is:

1. An automatic telephone trunk commandeer system for enabling trunks to be selectively switched from a switching network to preferred customers connected to said switching network, the said system consisting of means for generating a trunk commandeer signal and sending said signal on to said trunk, said commandeer signal consisting of a pulse combination of the "p out-of n" binary code in which a binary digit is represented by short duration pulses and the other binary digit by long duration pulses, means for receiving said pulse combination, means for comparing the duration of the pulses received with a predetermined period and separating the pulses having a duration lesser than said predetermined duration from the pulses having a duration larger than said predetermined duration, means for serially storing according to the combination pulses serial number the long duration pulses, a transfer relay for switching the trunk and a circuit for checking the "p out-of n" code inserted between said storing means and said transfer relay.

2. An automatic telephone trunk commandeer system as set forth in claim 1, in which the trunk conveys regular pulses corresponding to an engagement on a regular customer call and commandeer pulse signals corresponding to an engagement on a preferred customer call, the short duration pulses of the commandeer signal being longer than the regular pulses and the pulse combination receiving means comprises a call time-delayed relay insensitive to the regular pulses and sensitive to the short and long duration pulses of the commandeer signal.

3. An automatic telephone trunk commandeer system as set forth in claim 1 in which the means for comparing the duration of the pulses received with a predetermined period comprises a relay counter having a plurality of outputs successively energized and advancing at a period which is a submultiple of the predetermined period and a timing relay connected to a selected output of said relay counter which is energized at a time later than said given period and the storing means comprises a relay counter counting the pulses of the "p out-of n" combination, store relays connected to the output of said relay counter and successively energized thereby and means for selectively inhibiting the energization of said store relays under the control of the timing relay whereby only the store relays corresponding to long duration pulses are energized.

* * * * *